(12) United States Patent
Du et al.

(10) Patent No.: US 8,194,498 B2
(45) Date of Patent: Jun. 5, 2012

(54) USING A WAVE PROPAGATOR FOR TRANSVERSELY ISOTROPIC MEDIA

(75) Inventors: Xiang Du, Crawley (GB); Robin Fletcher, Guildford (GB)

(73) Assignee: WesternGeco L.L.C., Houston, TX (US)

( * ) Notice: Subject to any disclaimer, the term of this patent is extended or adjusted under 35 U.S.C. 154(b) by 702 days.

(21) Appl. No.: 12/354,346

(22) Filed: Jan. 15, 2009

(65) Prior Publication Data

US 2009/0213693 A1    Aug. 27, 2009

Related U.S. Application Data

(60) Provisional application No. 61/011,606, filed on Jan. 18, 2008, provisional application No. 61/011,627, filed on Jan. 18, 2008, provisional application No. 61/104,579, filed on Oct. 10, 2008.

(51) Int. Cl.
     *G01V 1/00*      (2006.01)
(52) U.S. Cl. ................... 367/73; 702/14; 703/5
(58) Field of Classification Search .............. 367/73, 367/37; 702/14; 703/5
     See application file for complete search history.

(56) References Cited

U.S. PATENT DOCUMENTS

| | | | |
|---|---|---|---|
| 6,748,330 B2* | 6/2004 | Leaney | 702/14 |
| 2004/0196738 A1 | 10/2004 | Tal-Ezer | |
| 2006/0190179 A1* | 8/2006 | Herrmann et al. | 702/14 |
| 2007/0168167 A1* | 7/2007 | Lou | 703/5 |

FOREIGN PATENT DOCUMENTS

WO      2001075482 A2      10/2001

OTHER PUBLICATIONS

Alkhalifah, An Acoustic Wave Equation for Anisotropic Media, Geophysics, Jul.-Aug. 2000, pp. 1239-1250, vol. 65, No. 4.
Du, et al., Anistropic Reverse-Time Migration for Tilted TI Media, Geophysical Prospecting, 2007, pp. 853-869, vol. 55.
Du, et al., A New Pseudo-Acoustic Wave Equation for VTI Media, EAGE 70th Conference and Exhibition, Jun. 2008.
Fletcher, et al., A new Pseudo-Acoustic Wave Equation for TI Media, SEG Annual Meeting, 2008.
Grechka, Shear Waves in Acoustic Anisotropic Media, Geophysics, Mar.-Apr. 2004, pp. 576-582, vol. 69, No. 2.
Hestholm, Acoustic VTI Modeling using High-Order-Finite-Differences, SEG Expanded Abstracts, 2007, pp. 139-143, vol. 26.
Klie, et al., A New Acoustic Wave Equation for Modeling in Anisotropic Media, SEG Exposition and Annual Meeting, Sep. 2001.
Shan, Optimized Implicit Finite-Difference Migration for VTI Media, SEG Annual Meeting, 2006, pp. 2367-2371.

(Continued)

*Primary Examiner* — Mark Hellner

(57) ABSTRACT

A technique includes modeling a seismic wavefield in a vertical transversely isotropic media as a second order derivative of a first wavefield function with respect to a vertical direction and not with respect to crossline and inline directions and as second order derivatives of a second wave field function with respect to the inline and crossline directions and not with respect to the vertical direction. The method includes processing seismic measurements of the media in accordance with the modeled seismic wavefield to obtain information about the media. In another technique, a seismic wavefield in a tilted transversely isotropic media are modeled based at least in part on orientation of the symmetry axis and a nonzero shear velocity for the media; and seismic measurements of the media are processed in accordance with the modeled seismic wavefield to obtain information associated with the media.

29 Claims, 13 Drawing Sheets

OTHER PUBLICATIONS

Thomsen, Weak Elastic Anisotropy, Geophysics, Oct. 1986, pp. 1954-1966, vol. 51, No. 10.

Zhang, et al., An acoustic wave equation for modeling in tilted TI media: 73rd Annual International Meeting, 2003, SEG, Expanded Abstracts, 153-156.

Zhang, et al., Reverse Time Migration in 3D Heterogeneous TTI Media, SEG Annual Meeting, 2008, pp. 2196-2200.

Zhou, et al., An Anisotropic Acoustic Wave Equation for VTI Media, EAGE Conference and Exhibition, Jun. 2006.

Zhou, et al., An Anisotropic Acoustic Wave Equation for Modeling and Migration in 2D TTI Media, SEG Annual Meeting, 2006, pp. 194-198.

PCT Search Report, dated Dec. 21, 2010, Application No. PCT/US2009/031315.

\* cited by examiner

USING A WAVE PROPAGATOR FOR
TRANSVERSELY ISOTROPIC MEDIA

This application claims the benefit under 35 U.S.C. §119 (e) to U.S. Provisional Patent Application Ser. No. 61/011, 606, entitled, "USING A WAVE PROPAGATOR FOR VERTICAL TRANSVERSELY ISOTROPIC MEDIA," filed on Jan. 18, 2008, U.S. Provisional Patent Application Ser. No. 61/011,627, entitled, "A NEW PSEUDO-ACOUSTIC WAVE EQUATION FOR VTI MEDIA," filed on Jan. 18, 2008; and U.S. Provisional Patent Application Ser. No. 61/104,579, entitled, "Wave Propagator for Acoustic TTI Media," filed on Oct. 10, 2008. Each of these applications is hereby incorporated by reference in its entirety.

BACKGROUND

The invention generally relates to using a wave propagator for transversely isotropic media, and more specifically, the invention relates to using a pseudo-acoustic wave propagator for vertical transversely isotropic media and tilted transversely isotropic media.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes modeling a seismic wavefield in a vertical transversely isotropic media as a second order derivative of a first wavefield function with respect to a vertical direction and not with respect to crossline and inline directions and as second order derivatives of a second wavefield function with respect to the inline and crossline directions and not with respect to the vertical direction. The method includes processing seismic measurements of the media in accordance with the modeled seismic wavefield to obtain information about the media.

In another embodiment of the invention, a technique includes modeling a seismic wavefield in a transversely isotropic media having a symmetry axis that is tilted relative to a vertical axis based at least in part on an orientation of the symmetry axis and a nonzero shear velocity for the media. The technique includes processing seismic measurements of the media in accordance with the modeled seismic wavefield to obtain information, which is associated with the media.

Advantages and other features of the invention will become apparent from the following drawing, description and claims.

DETAILED DESCRIPTION

Figure 1:
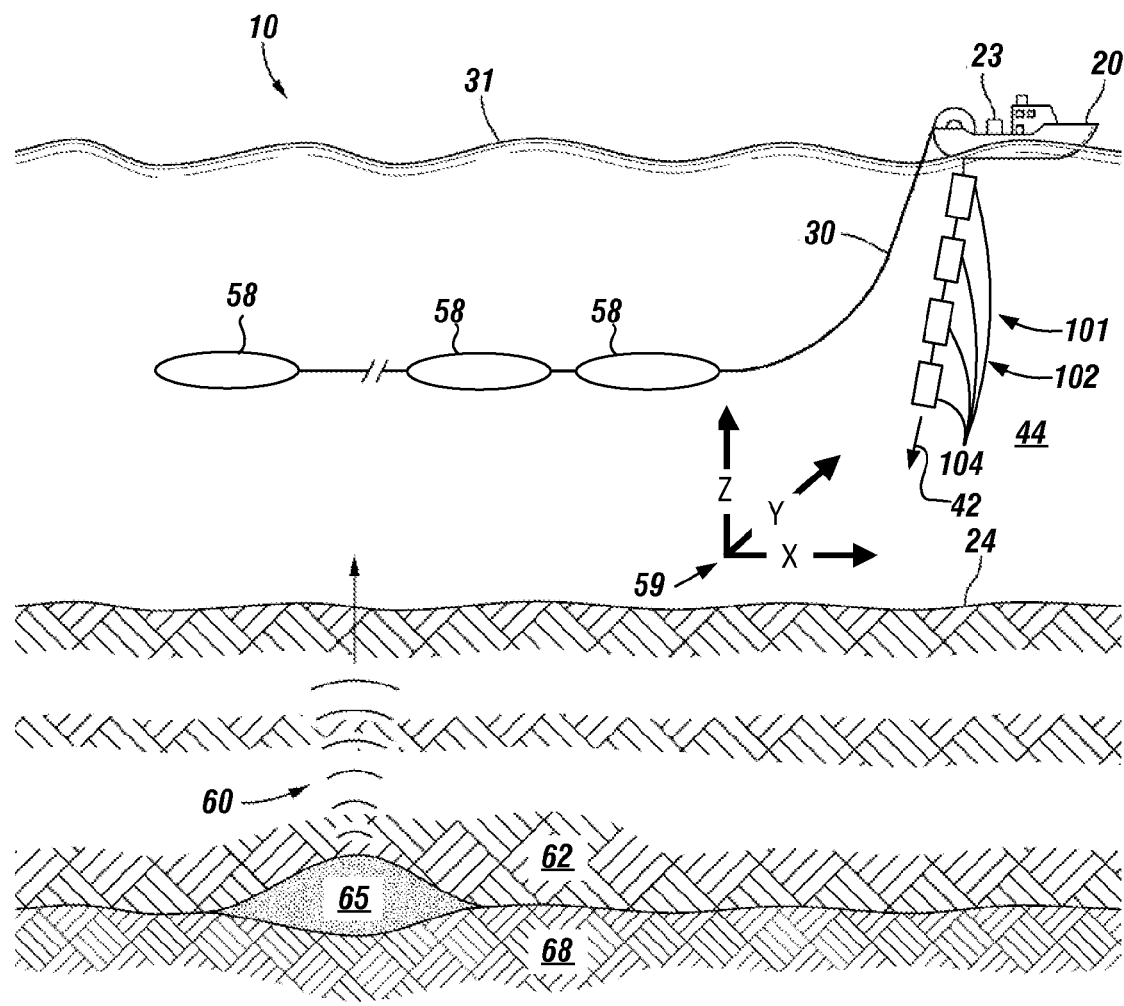
FIG. 1 is a schematic diagram of a marine seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with embodiments of the invention, the seismic sensors 58 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source that may be formed from one or more seismic source arrays 102 (one partial source array 102 being depicted in FIG. 1). Each source array 102, in turn, includes multiple strings 101 (one string 101 being depicted in FIG. 1) of source elements 104 (air guns, for example). In some embodiments of the invention, the seismic source elements 104 may be coupled to, or towed by, the survey vessel 20. Alternatively, in other embodiments of the invention, the seismic source elements 104 may operate independently of the survey vessel 20, in that the elements 104 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source elements 104 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors are particle motion sensors). The traces are recorded and may be at least partially processed by a signal processing unit 23 that is deployed on the survey vessel 20, in accordance with some embodiments of the invention. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

Figure 14:
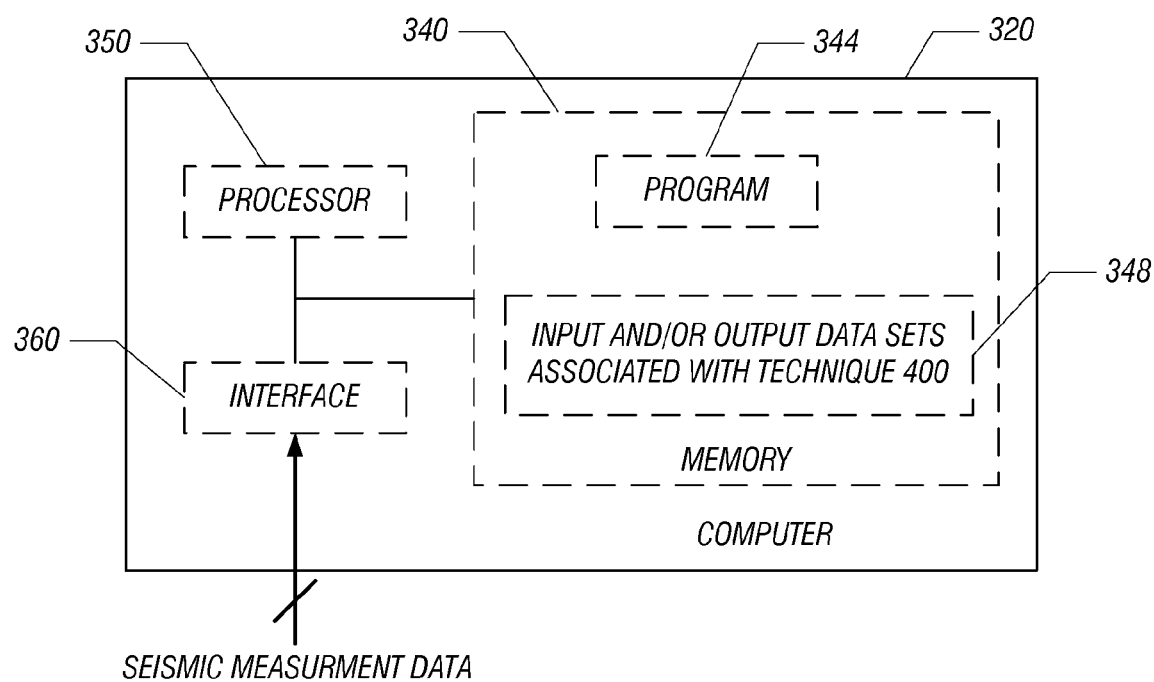
FIG. 14 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 14 and is further described below) that may be, for example, located on land or on the vessel 20. Thus, many variations are possible and are within the scope of the appended claims.

It is noted that the marine seismic data acquisition system 10 described above is merely an example of one of many different types of seismic data acquisition systems that may be used, in accordance with the many different embodiments of the invention. For example, in other embodiments of the invention, the seismic data acquisition system may use stationary sensor cables that are disposed on the seabed. As another example, in other embodiments of the invention, the seismic data acquisition system may be a land-based system in which sensor cables are buried in the earth. Thus, many variations are contemplated and are within the scope of the appended claims.

Seismic migration is a process that is typically is used for purposes of imaging the reflectivity distribution in the earth and involves backprojecting the reflection events that are recorded at the seismic sensors to the corresponding reflection points. Seismic migration may be complicated by seismic anisotropy, which is present in the media of a large number of exploration areas. Therefore, conventional isotropic migration methods for seismic imaging may be generally insufficient in these areas.

As a more specific example, a particular area being surveyed may include vertical transversely isotropic (VTI) media. Starting from the phase velocity equation in VTI media and setting the shear velocity along the symmetry axis to be zero, a dispersion relationship for three-dimensional (3-D) pseudo-acoustic VTI media may be described as follows:

$$\omega^4 - [v_x^2(k_x^2+k_y^2)+v_z^2k_z^2]\omega^2 - v_z^2(v_n^2-v_x^2)(k_x^2+k_y^2)k_z^2=0, \qquad \text{Eq. 1}$$

where "$k_x$", "$k_y$" and "$k_z$" represent wavenumbers in the x, y and z directions, respectively (see axes 59 in FIG. 1); "$\omega$" represents the angular frequency; "$v_z$" represents the vertical velocity; "$v_n = v_z\sqrt{1+2\delta}$" represents the normal move-out (NMO) velocity; "$v_x = v_z\sqrt{1+2\epsilon}$" represents the horizontal qP velocity; and "$\epsilon$" and "$\delta$" represent anisotropic parameters.

As described herein, a set of anisotropic wave equations (or "wave propagator") is derived from the dispersion relationship that is set forth in Eq. 1 and may be used to construct the wavefield in the VTI media in a computationally efficient manner, as compared to prior art wave propagators. Forward modeling and migration (reserve-time migration) using this set of anisotropic wave equations are described below.

If inverse Fourier transforms are applied, the following conventional set of wave equations, which include the wavefield function "p(x,y,z,t)" and an auxiliary fiction called "q(x, y,z,t)" may be derived, as described below:

$$\frac{\partial^2 p}{\partial t^2} = v_x^2 \left( \frac{\partial^2 p}{\partial x^2} + \frac{\partial^2 p}{\partial y^2} \right) + v_z^2 \frac{\partial^2 p}{\partial z^2} + v_z^2(v_n^2 - v_x^2) \left( \frac{\partial^4 q}{\partial x^2 \partial z^2} + \frac{\partial^4 q}{\partial y^2 \partial z^2} \right),$$ Eq. 2 and $$\frac{\partial^2 q}{\partial t^2} = p.$$ Eq. 3

Another conventional set of wave equations may be derived from Eq. 1 as follows. Eq. 1 may also be reformulated as follows:

$$v_z^2 k_z^2 = \omega^2 - v_x^2(k_x^2 + k_y^2) - \frac{v_n^2(v_x^2 - v_n^2)(k_x^2 + k_y^2)}{\omega^2 - (v_x^2 - v_n^2)(k_x^2 + k_y^2)}.$$ Eq. 4

By applying inverse Fourier transforms to Eq. 4 and introducing an auxiliary function called "q(x,y,z,t)", the following conventional set of wave equations may be derived:

$$\frac{\partial^2 p}{\partial t^2} = v_n^2 \left( \frac{\partial^2 p}{\partial x^2} + \frac{\partial^2 p}{\partial y^2} + \frac{\partial^2 q}{\partial x^2} + \frac{\partial^2 q}{\partial y^2} \right) + v_z^2 \frac{\partial^2 p}{\partial z^2},$$ Eq. 5 and $$\frac{\partial^2 q}{\partial t^2} = (v_x^2 - v_n^2) \left( \frac{\partial^2 p}{\partial x^2} + \frac{\partial^2 p}{\partial y^2} + \frac{\partial^2 q}{\partial x^2} + \frac{\partial^2 q}{\partial y^2} \right).$$ Eq. 6

Compared with Eqs. 2 and 3, Eqs. 5 and 6 are more efficient to implement as less derivatives are calculated.

In accordance with embodiments of the invention described herein, another set of wave equations may be derived from Eq. 1 for VTI media, which is computationally more efficient. To derive the new set of equations, both sides of Eq. 1 are multiplied with a wavefield function called "p($\omega$, $k_x$, $k_y$, $k_z$)" and the resulting equation is rewritten using the following expression:

$$q(\omega, k_x, k_y, k_z) = \frac{\omega^2 + (v_n^2 - v_x^2)(k_x^2 + k_y^2)}{\omega^2} p(\omega, k_x, k_y, k_z).$$ Eq. 7

The resulting equation is the following:

$$\omega^2 p(\omega, k_x, k_y, k_z) = v_x^2 (k_x^2 + k_y^2) p(\omega, k_x, k_y, k_z) + v_z^2 k_z^2 q(\omega, k_x, k_y, k_z).$$ Eq. 8

An inverse Fourier transform may then be applied to Eq. 8 using the following relationships:

$$i\omega \leftrightarrow \frac{\partial}{\partial t},$$ Eq. 9

$$-ik_x \leftrightarrow \frac{\partial}{\partial x},$$ Eq. 10

$$-ik_y \leftrightarrow \frac{\partial}{\partial y},$$ Eq. 11 and $$-ik_z \leftrightarrow \frac{\partial}{\partial z}.$$ Eq. 12

The above-described procedure produces the following equations:

$$\frac{\partial^2 p}{\partial t^2} = v_x^2 \left( \frac{\partial^2 p}{\partial x^2} + \frac{\partial^2 p}{\partial y^2} \right) + v_z^2 \frac{\partial^2 q}{\partial z^2},$$ Eq. 13 and $$\frac{\partial^2 q}{\partial t^2} = \frac{\partial^2 p}{\partial t^2} + (v_n^2 - v_x^2) \left( \frac{\partial^2 p}{\partial x^2} + \frac{\partial^2 p}{\partial y^2} \right).$$ Eq. 14

Substituting Eq. 13 into Eq. 14 yields the following expression:

$$\frac{\partial^2 q}{\partial t^2} = v_n^2 \left( \frac{\partial^2 p}{\partial x^2} + \frac{\partial^2 p}{\partial y^2} \right) + v_z^2 \frac{\partial^2 q}{\partial z^2}.$$ Eq. 15

The final set of wave equations may be written as follows:

$$\frac{\partial^2 p}{\partial t^2} = v_x^2 \left( \frac{\partial^2 p}{\partial x^2} + \frac{\partial^2 p}{\partial y^2} \right) + v_z^2 \frac{\partial^2 q}{\partial z^2}, \text{ and}$$ Eq. 16

$$\frac{\partial^2 q}{\partial t^2} = v_n^2 \left( \frac{\partial^2 p}{\partial x^2} + \frac{\partial^2 p}{\partial y^2} \right) + v_z^2 \frac{\partial^2 q}{\partial z^2}.$$ Eq. 17

For seismic forward modeling, the source function is injected in the right side of both Eqs. 16 and 17. Eqs. 16 and 17 appear symmetrical, the wavefield function p has a second order derivative in the x and y directions, and the q wavefield function has second order derivatives in the z direction.

Wavefield functions p and q in Eqs. 16 and 17 have the similar kinematical characteristics, as demonstrated further below. The computational cost of the wave equations set forth in Eqs. 5 and 6 may be made comparable to that of Eqs. 16 and 17; but Eqs. 5 and 6 require extra memory to save an intermediate variable (p+q). Characteristics of the p and q functions of all three wave equations are discussed below.

It is noted that the set of wave equations that is expressed in Eqs. 5 and 6 with the denotation of variables p' and q' may be derived by assuming "p=p'+q'" and "q=p'" in Eqs. 16 and 17, which produces the following expressions:

$$\frac{\partial^2 p'}{\partial t^2} + \frac{\partial^2 q'}{\partial t^2} = v_x^2 \left( \frac{\partial^2 p'}{\partial x^2} + \frac{\partial^2 p'}{\partial y^2} + \frac{\partial^2 q'}{\partial x^2} + \frac{\partial^2 q'}{\partial y^2} \right) + v_z^2 \frac{\partial^2 p'}{\partial z^2},$$ Eq. 18 and $$\frac{\partial^2 p'}{\partial t^2} = v_n^2 \left( \frac{\partial^2 p'}{\partial x^2} + \frac{\partial^2 p'}{\partial y^2} + \frac{\partial^2 q'}{\partial x^2} + \frac{\partial^2 q'}{\partial y^2} \right) + v_z^2 \frac{\partial^2 p'}{\partial z^2},$$ Eq. 19

By substituting Eq. 19 into Eq. 18, Eq. 18 becomes the following:

$$\frac{\partial^2 q'}{\partial t^2} = (v_x^2 - v_n^2)\left(\frac{\partial^2 p'}{\partial x^2} + \frac{\partial^2 p'}{\partial y^2} + \frac{\partial^2 q'}{\partial x^2} + \frac{\partial^2 q'}{\partial y^2}\right). \quad \text{Eq. 20}$$

Thus, the p wavefield function expressed in Eqs. 5 and 6 is the same as the q in Eqs. 16 and 17, and the q wavefield function in Eqs. 16 and 17 is equivalent to the sum of p and q in Eqs. 5 and 6.

In a modeling experiment, time snapshots of wave propagation in a homogenous anisotropic media ($v_z$=3000 m/s, $\epsilon$=0.24, and $\delta$=0.1) were simulated using finite differencing. FIGS. 2 to 6 correspond to the same time snapshot from modeling with the sets of wave equations described herein. The ellipsoidal compressional p wavefield and a diamond shape of the SV-wave aliasing wavefield are present in each figure.

Figure 2:
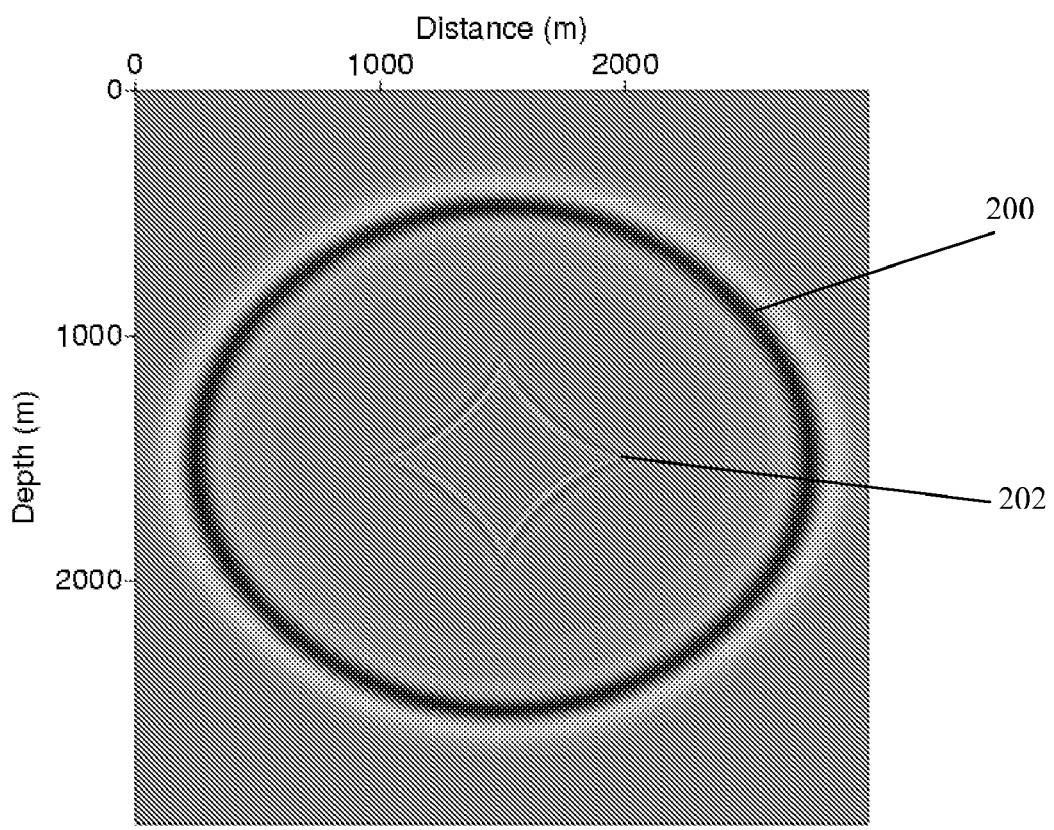
FIGS. 2, 3 and 4 are illustrations of wavefields derived from pseudo-acoustic wave propagators for vertical transversely isotropic media of the prior art.
Figure 3:
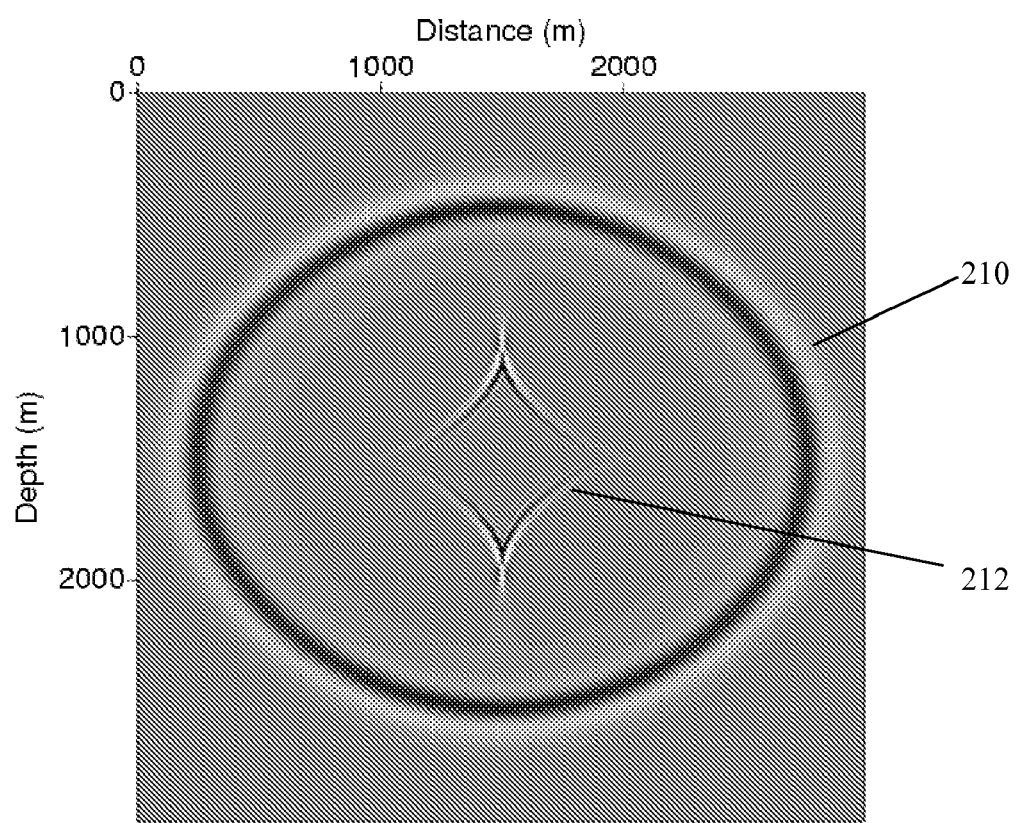

FIG. 2 illustrates a p wavefield 200 derived using Eqs. 2 and 3. The p wavefield 200 and an aliasing SV wavefield 202 are symmetric along the coordinate axes. FIG. 3 illustrates a p wavefield 210 and an aliasing SV wavefield 212 derived using Eqs. 5 and 6 with similar wave phenomena. It appears that Eqs. 5 and 6 introduce a directional difference in the wavefront of the SV-wave aliasing. It is clearer to see the problem in FIG. 7, which displays a difference 250 between the p wavefield 200 (FIG. 2) derived using Eqs. 2 and 3 and the p wavefield 210 (FIG. 3) derived using Eqs. 5 and 6. The difference of the p-wave energy also varies along the wavefront.

Figure 4:
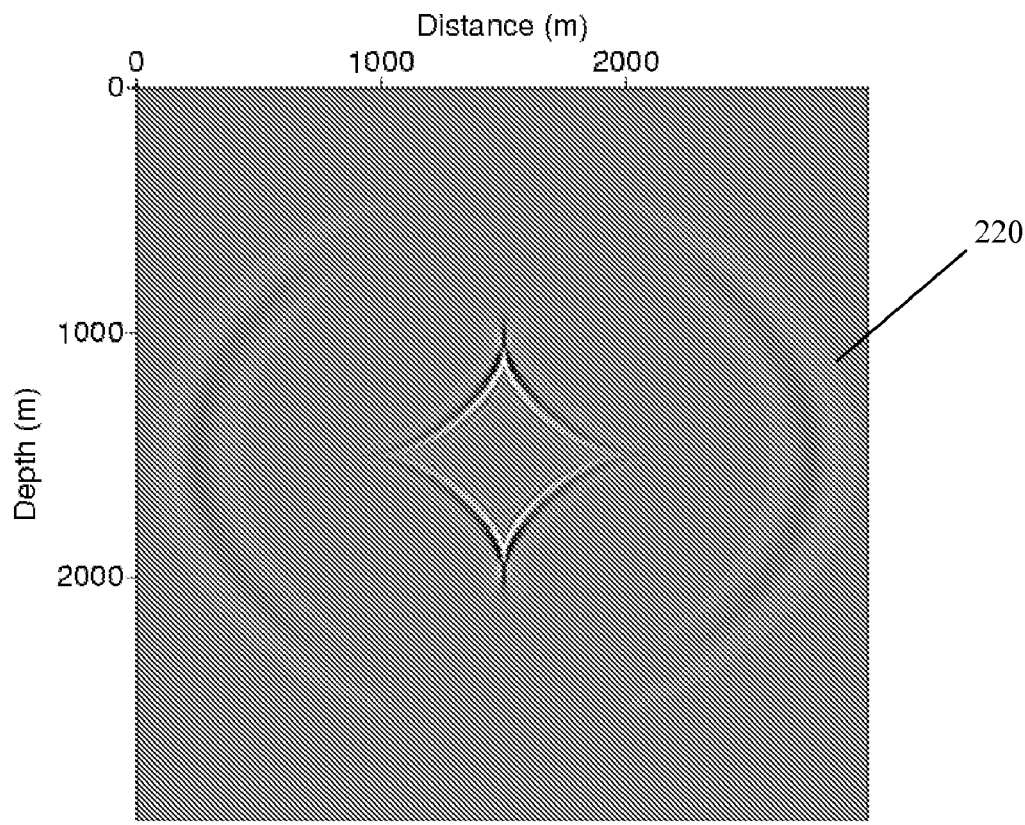
Figure 5:
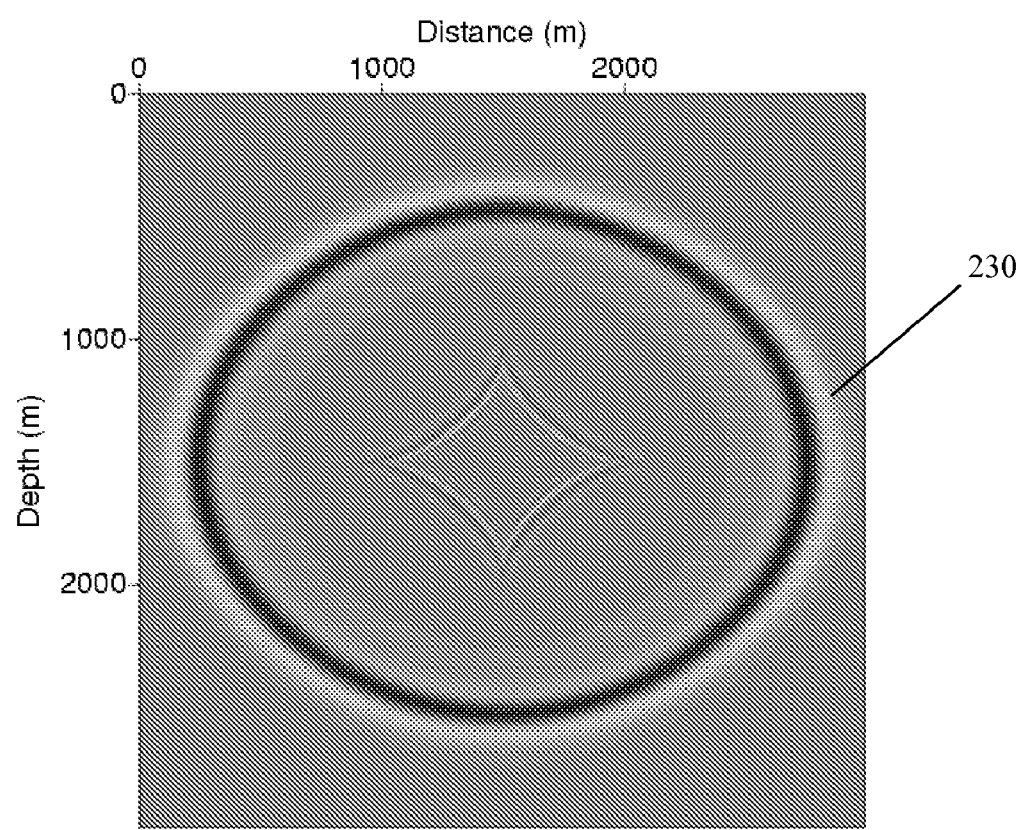
FIGS. 5 and 6 are illustrations of wavefields derived from a pseudo-acoustic wave propagator for vertical transversely isotropic media according to an embodiment of the invention.
Figure 6:
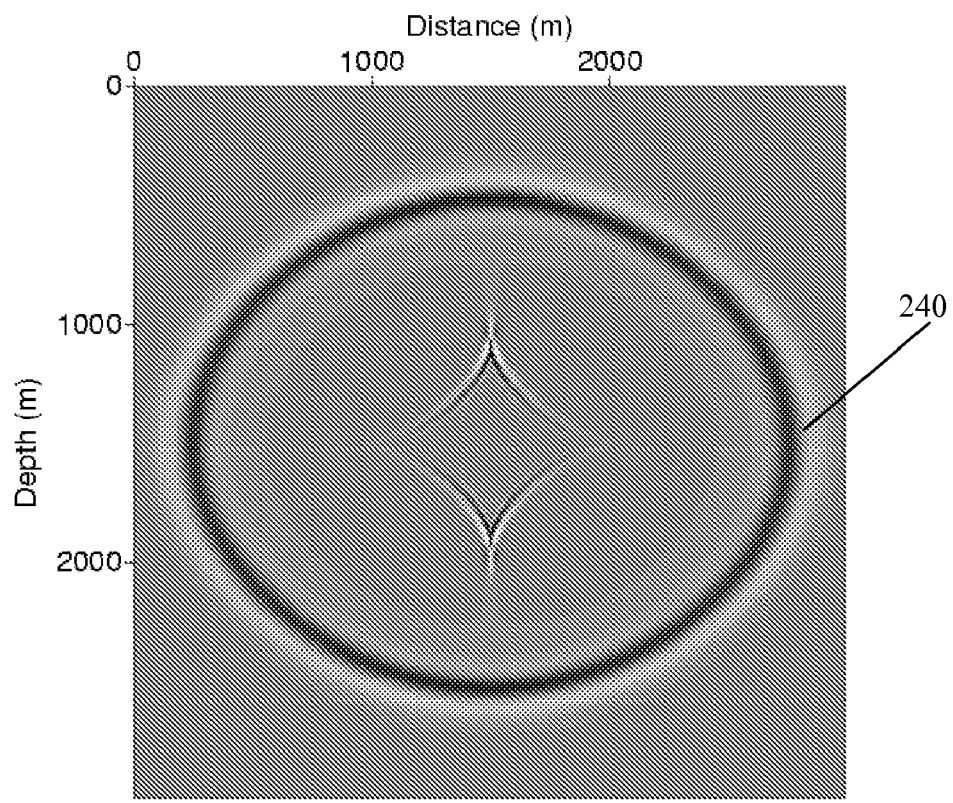
Figure 7:
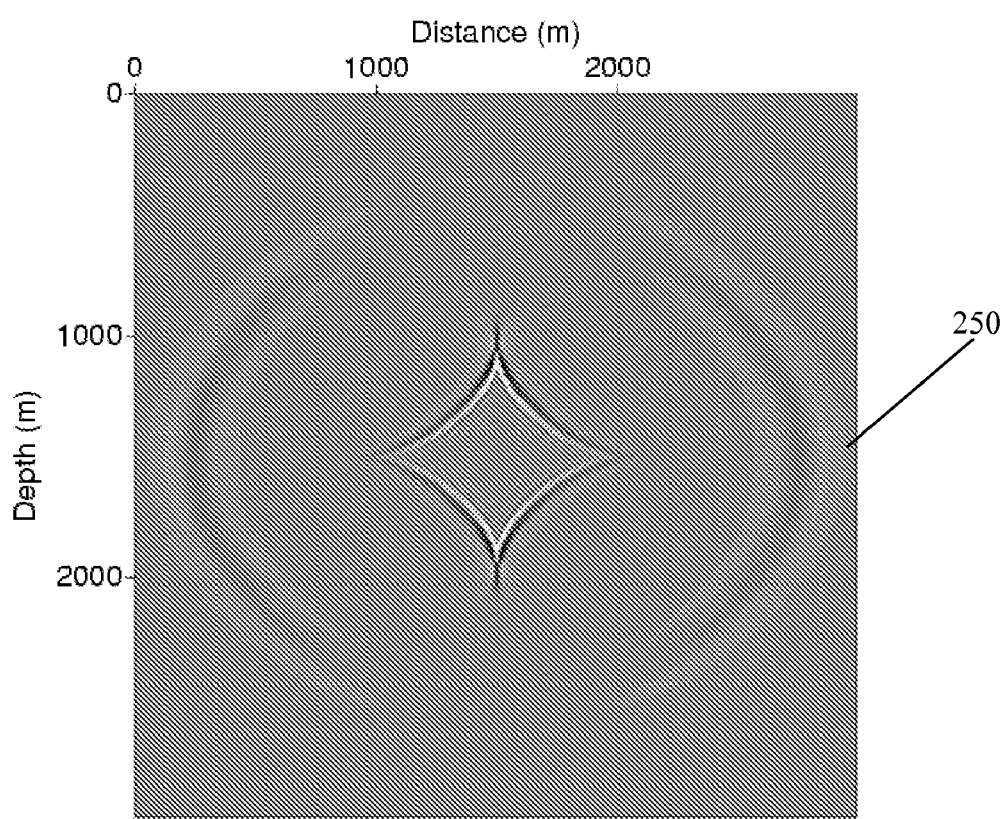
FIG. 7 is an illustration of a difference between wavefields derived from wave propagators of the prior art.

FIG. 4 illustrates a q wavefield 220 derived from Eqs. 5 and 6 is quite similar to the difference 250 that is displayed in FIG. 7. FIGS. 5 and 6 depict p 230 and q 240 wavefields derived from Eqs. 16 and 17. Referring to FIG. 5, a p wavefield 230 that is derived from Eqs. 16 and 17 is almost the same as the p wavefield 200 (FIG. 2) that is derived from Eqs. 2 and 3. Referring to FIG. 6, the q wavefield function in Eqs. 16 and 17 is the same as the p wavefield function of Eqs. 5 and 6.

Figure 8:
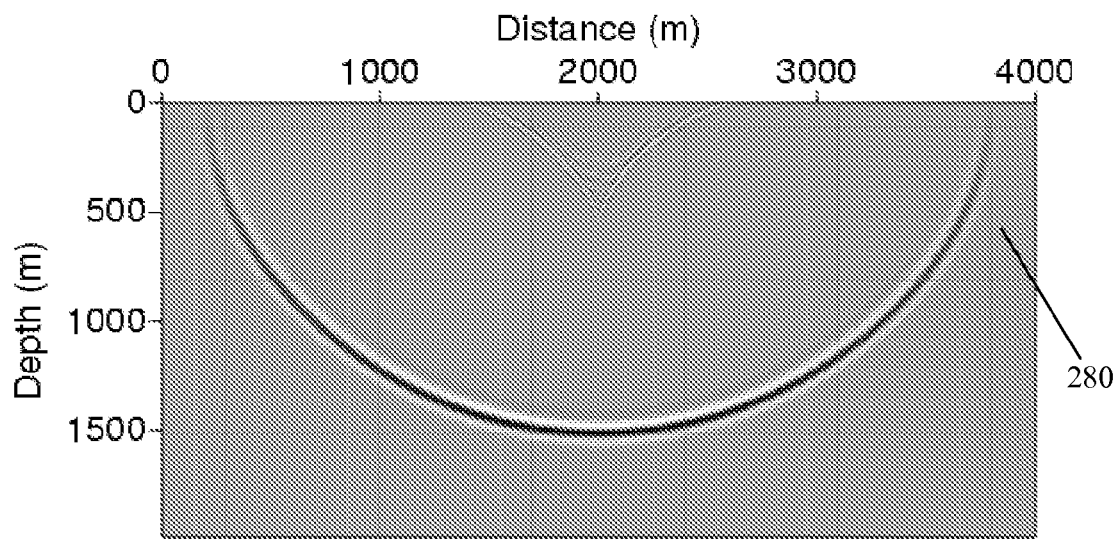
FIG. 8 is an illustration of an impulse response of a wavefield derived from a wave propagator according to an embodiment of the invention.
Figure 9:
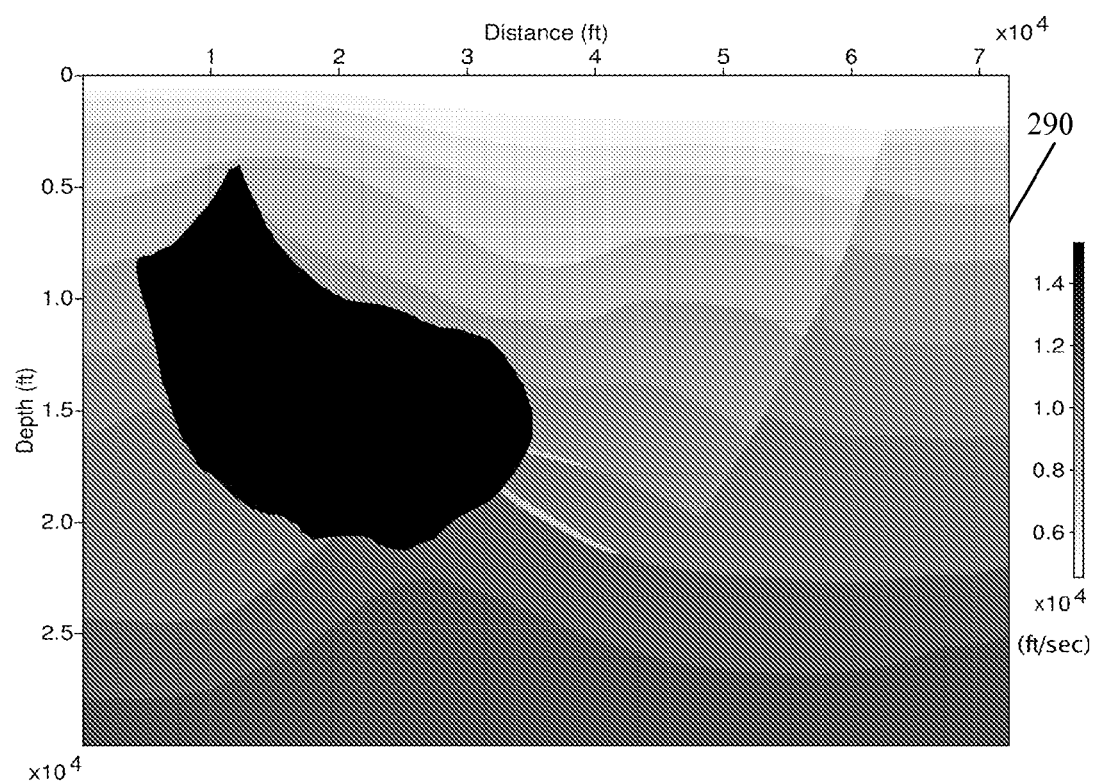
FIG. 9 is an illustration of a velocity model according to an embodiment of the invention.
Figure 10:
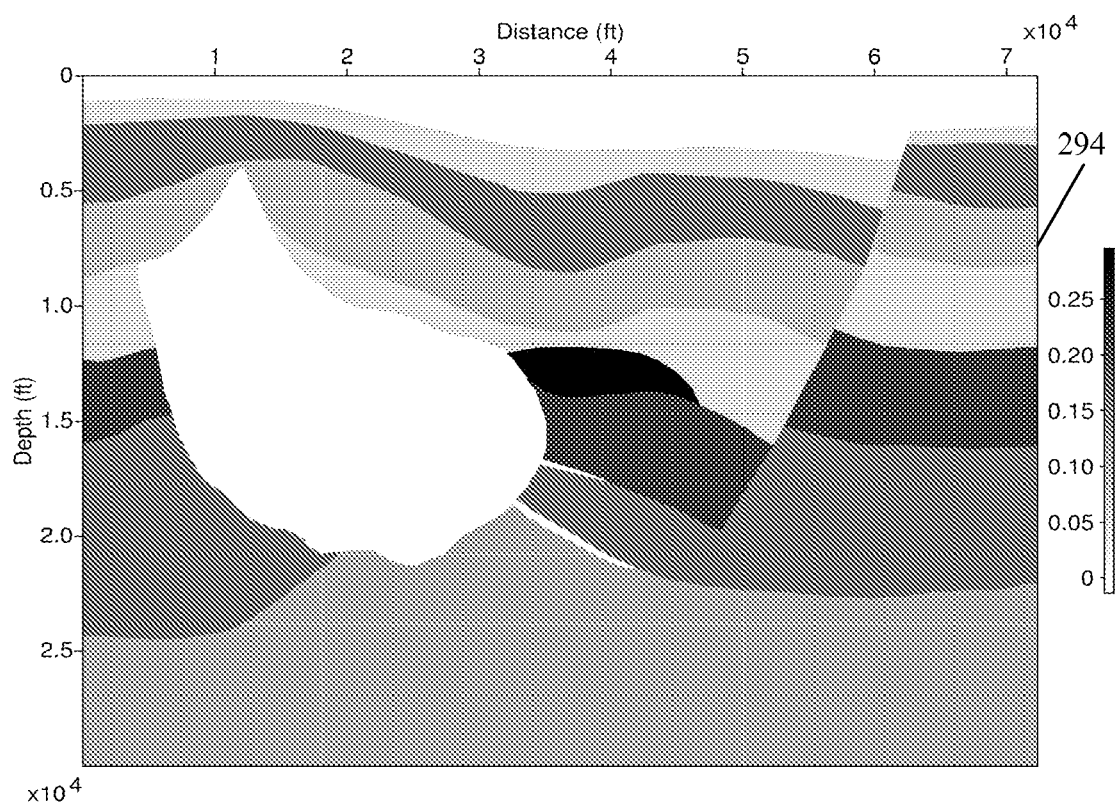
FIGS. 10 and 11 are illustrations of anisotropic parameters according to an embodiment of the invention.
Figure 11:
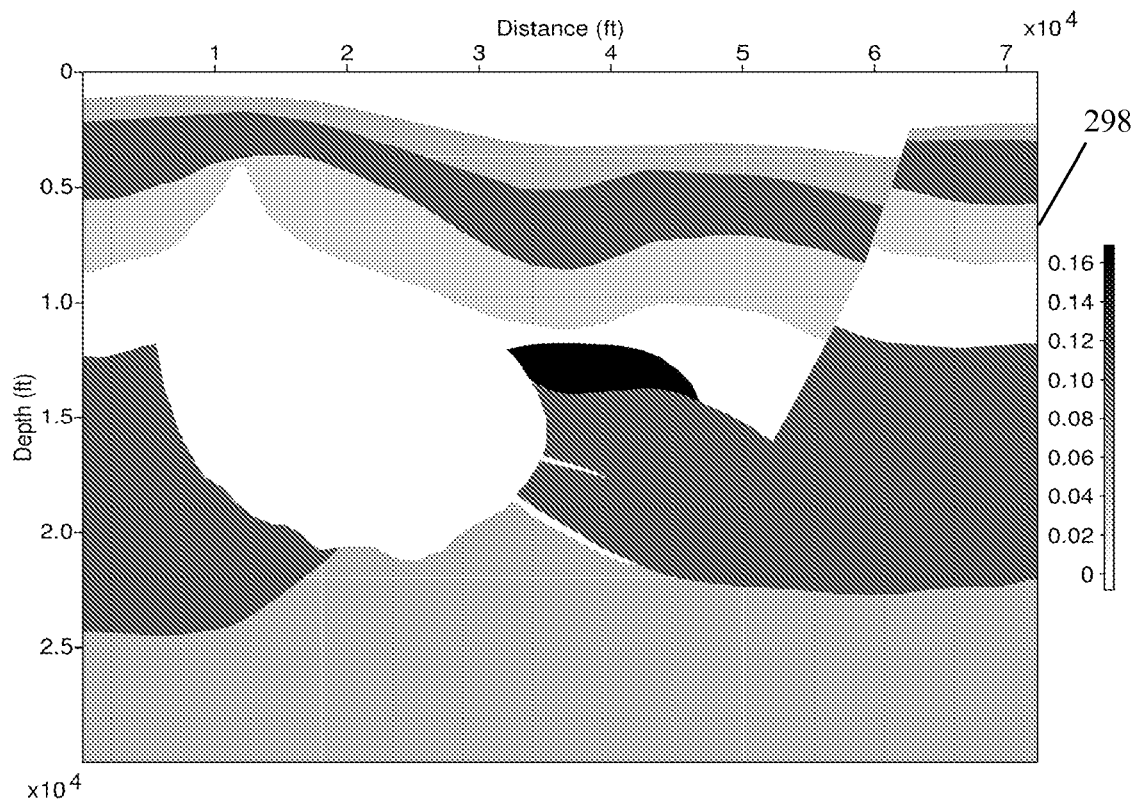
Figure 12:
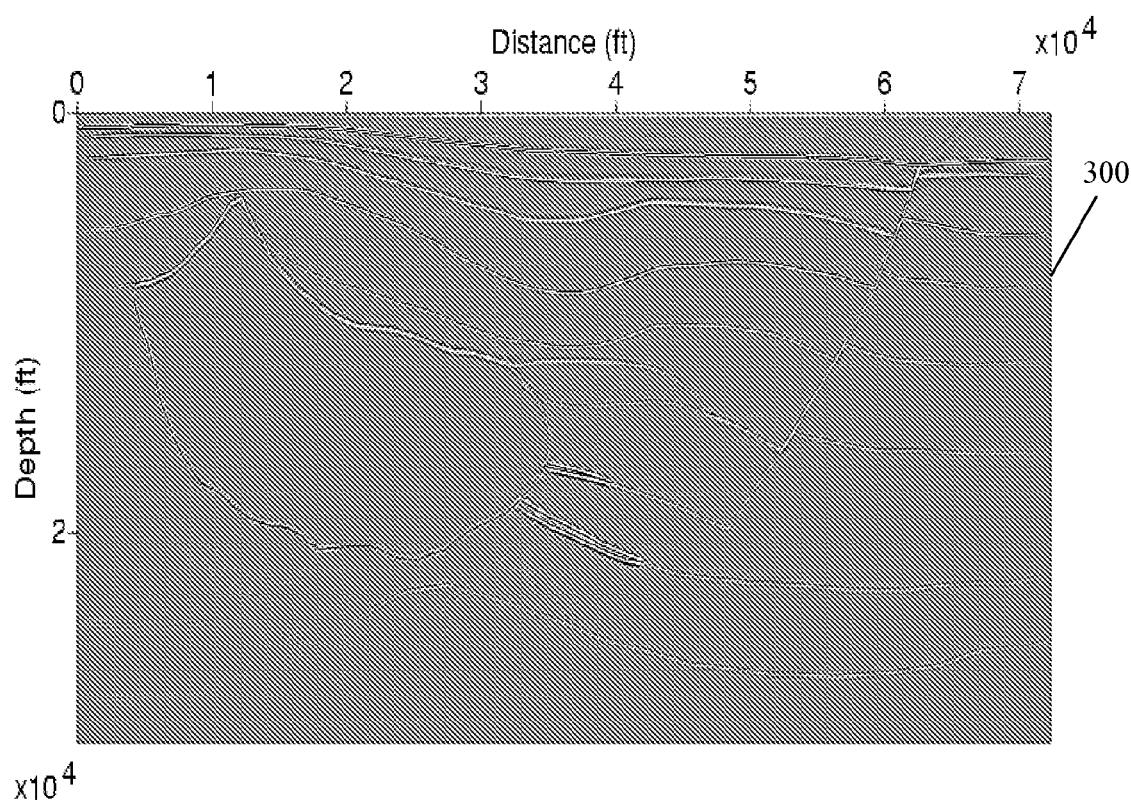
FIG. 12 depicts the result of prestack anisotropic reverse-time migration according to an embodiment of the invention.

Reverse-time migration was implemented using Eqs. 16 and 17. FIG. 8 shows its impulse response 280 in the same homogeneous anisotropic medium. An anisotropic salt model was chosen for purposes of example to verify this operator for complex media. FIGS. 9, 10 and 11 correspond to velocity files 290 and anisotropic parameters ($\epsilon$ 294 and $\delta$ 298). FIG. 12 displays the anisotropic reverse-time migration result 300.

Figure 13:
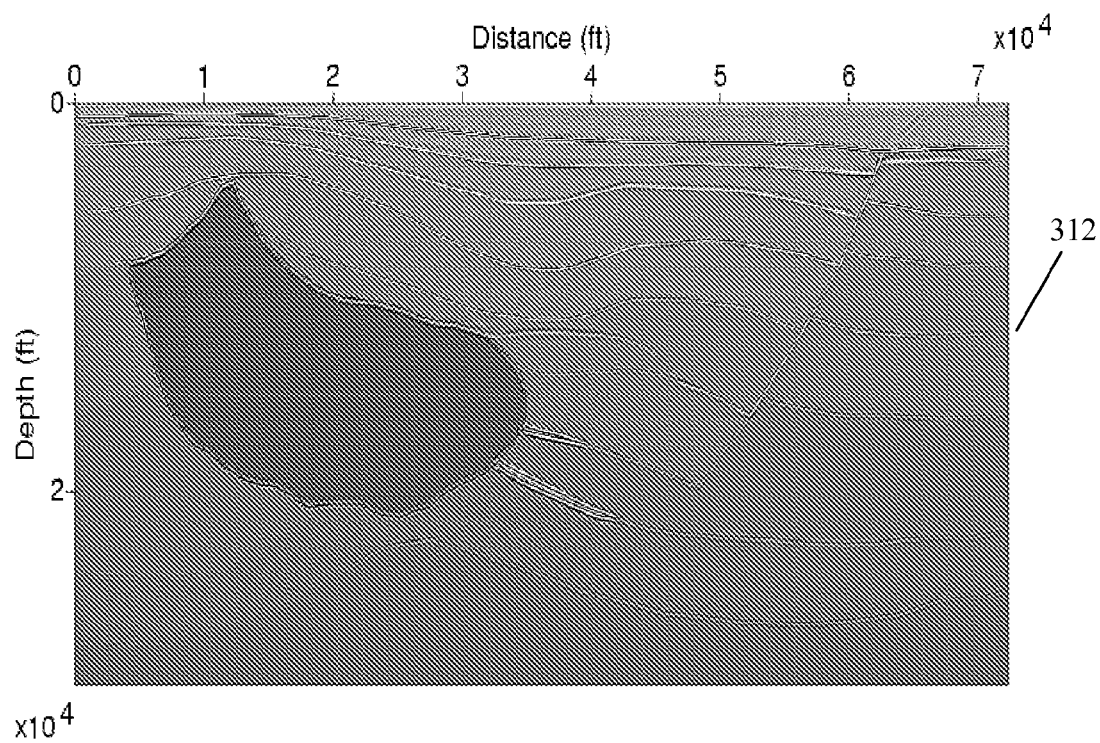
FIG. 13 is an illustration of an overlap of the anisotropic reverse-time migration of FIG. 12 and the velocity model of FIG. 9 according to an embodiment of the invention.

The accurate imaging of the steep fault, salt tank and the two abnormal sediments can be seen from an overlay 312 of the image on the velocity model, which is depicted in FIG. 13.

Figure 15:
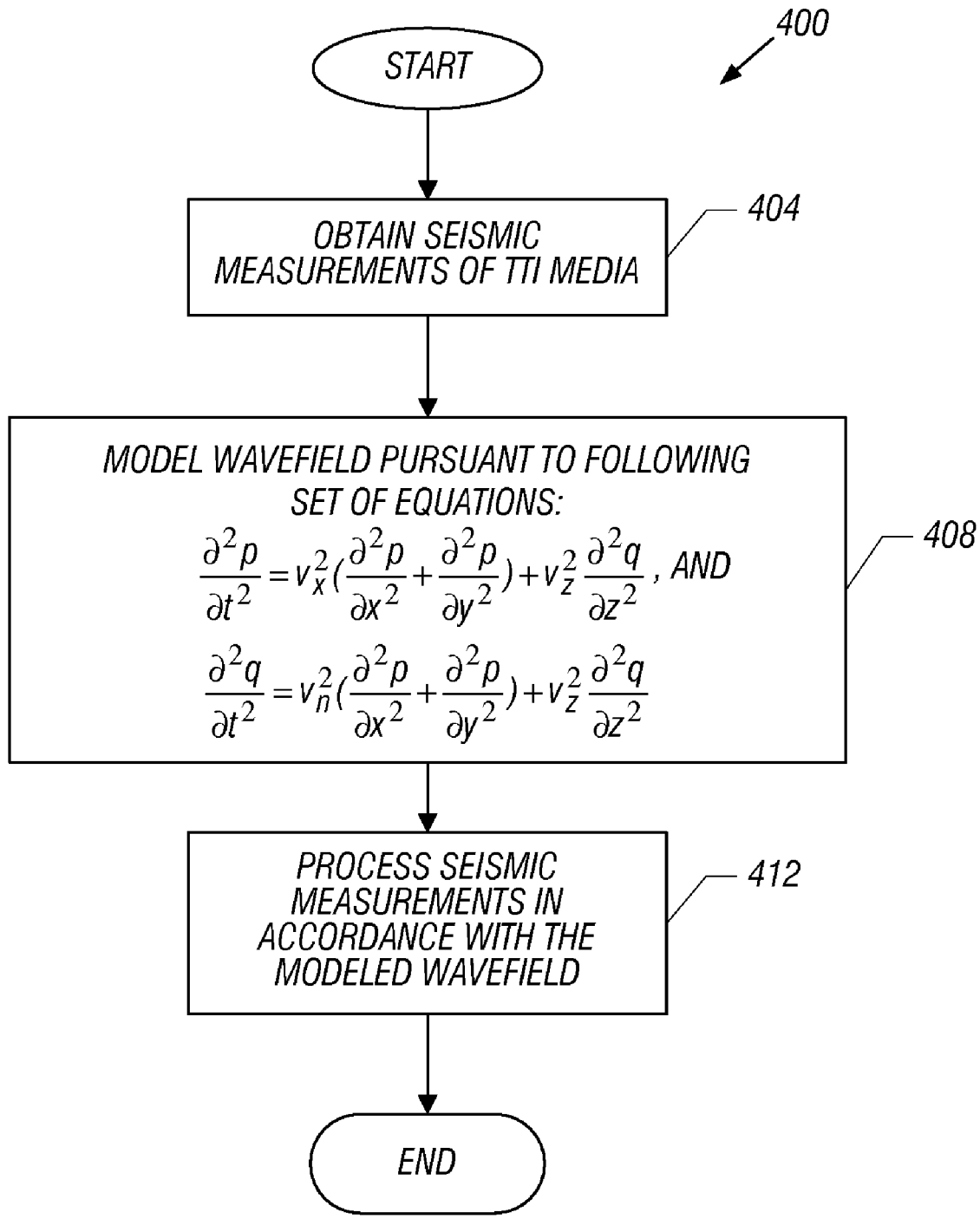
FIG. 15 is a flow diagram depicting a technique to process seismic data measurements acquired from vertical transversely isotropic media according to an embodiment of the invention.

Referring to FIG. 15, to summarize a technique 400 in accordance with embodiments of the invention includes obtaining (block 404) seismic measurements of VTI media. A wavefield in the VTI media is then modeled, pursuant to block 408, using Eqs. 16 and 17. The seismic measurements may then be processed in accordance with the modeled wavefield, pursuant to block 412, for such purposes as migration (as a non-limiting example).

Referring to FIG. 14, in accordance with some embodiments of the invention, a data processing system 320 may perform at least some of the techniques that are disclosed herein for such purposes modeling a wavefield in VTI media and processing seismic data indicative of seismic measurements acquired of the VTI media for such purposes of migration (as a non-limiting example). The system 320 may be located on one of the streamers, on a source array, on the survey vessel, at a remote land-based facility, on a land-based or seabed based sensor cable, etc. In accordance with some embodiments of the invention, the system 320 may include a processor 350, such as one or more microprocessors and/or microcontrollers.

The processor 350 may be coupled to a communication interface 360 for purposes of receiving seismic measurement data. In this regard, the data may be pressure data and/or may be multi-component data. Furthermore, the seismic measurement data may be received from a towed survey, a seabed survey, a land-based survey, etc. As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets involved with the techniques that are described herein. The memory 340 may store program instructions 344, which when executed by the processor 350, may cause the processor 350 to perform one or more of the techniques that are disclosed herein, such as the technique 400 (as a non-limiting example) and display results obtained via the technique(s) on a display (not shown in FIG. 14) of the system 320, in accordance with some embodiments of the invention. For example, the display may be an image that depicts reflectivity boundaries that are obtained via a migration analysis.

Other embodiments are contemplated and are within the scope of the appended claims. For example, in accordance with some embodiments of the invention, the transversely isotropic media may have an axis of symmetry, which is tilted with respect to the vertical, or z, axis. As described herein, a wavefield propagator may be constructed for this tilted transversely isotropic (TTI) media.

More specifically, the following description focuses on a pseudo-acoustic tilted transversely isotropic (TTI) wave equation derived using a pressure-vertical shear velocity (P-SV) TTI dispersion relation. For media with a constant vertical axis of symmetry, it is relatively straightforward to implement modeling and migration with the vertical shear velocity set to zero. However, for modeling and migration in heterogeneous TTI media, it has been discovered that a variable non-vertical axis of symmetry may cause instabilities with numerical implementations. As described herein, a finite shear velocity is chosen to stabilize these numerical implementations that describe wave propagation in heterogeneous TTI media while minimizing SV waves that are considered as artifacts for acoustic modeling and migration.

Figure 16:
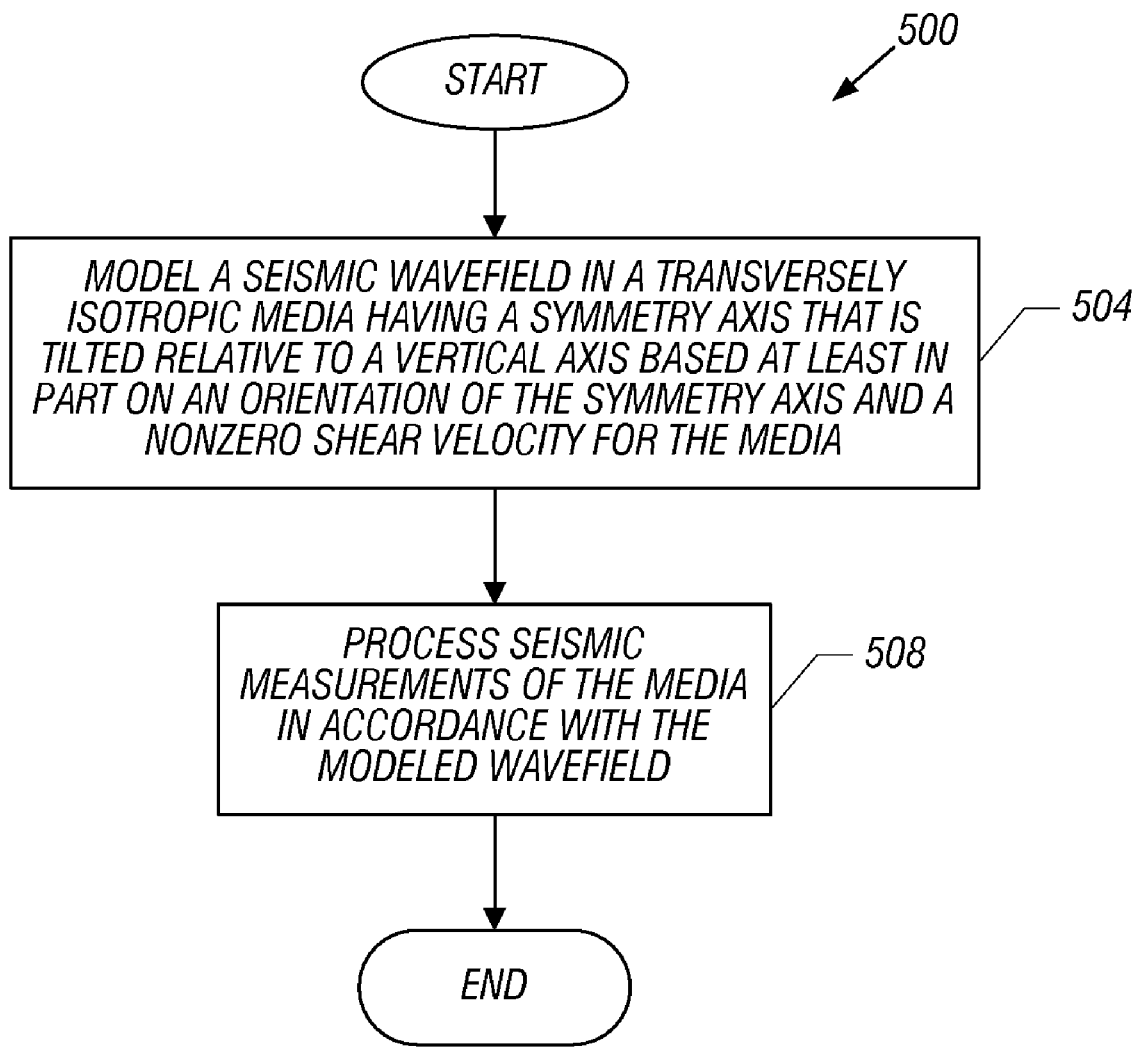
FIGS. 16 and 17 are flow diagrams depicting techniques to process seismic data measurements acquired from tilted transversely isotropic media according to embodiments of the invention.

Thus, in accordance with embodiments of the invention, a technique 500 that is depicted in FIG. 16 may be used for TTI media. The technique 500 includes modeling (block 504) a seismic wavefield in TTI media, which has a symmetry axis that is tilted relative to a vertical axis based at least in part on an orientation of the symmetry axis and a nonzero shear velocity for the media. The technique 500 includes processing the seismic measurements of the media in accordance with the modeled wavefield, pursuant to block 508.

As a non-limiting example, a wavefield propagator for the TTI media may be constructed as follows. The rotation is represented by a dip angle (called "θ" herein) measured relative to vertical and an azimuth angle (called "φ" herein). The rotated wavenumbers may be described in terms of the dip $\theta$ and azimuth $\phi$ angles as follows:

$$\hat{k}_x = k_x \cos\theta \cos\phi + k_y \cos\theta \sin\phi - k_z \sin\theta, \quad \text{Eq. 21}$$

$$\hat{k}_y = -k_x \sin\phi + k_y \cos\phi, \text{ and} \quad \text{Eq. 22}$$

$$\hat{k}_z = k_x \sin\theta \cos\phi + k_y \sin\theta \sin\phi + k_z \cos\theta. \quad \text{Eq. 23}$$

The exact P-SV TTI dispersion relation may be written as follows:

$$\omega^4 = \left[ \begin{array}{c} (v_{px}^2 + v_{sz}^2)(\hat{k}_x^2 + \hat{k}_y^2) + \\ (v_{pz}^2 + v_{sz}^2)\hat{k}_z^2 \end{array} \right] \omega^2 - v_{px}^2 v_{sz}^2 (\hat{k}_x^2 + \hat{k}_y^2)^2 - \quad \text{Eq. 24}$$
$$v_{pz}^2 v_{sz}^2 \hat{k}_z^4 + \left[ \frac{v_{pz}^2(v_{pn}^2 - v_{px}^2) -}{v_{sz}^2(v_{pn}^2 + v_{pz}^2)} \right] (\hat{k}_x^2 + \hat{k}_y^2)\hat{k}_z^2,$$

where the "^" notation over the wavenumbers indicates that the wavenumbers are evaluated in a rotated coordinate system aligned with the symmetry axis. In Eq. 24, "$\omega$" represents angular frequency; "$v_{pz}$" represents the qP wave velocity in the direction normal to the symmetry plane; "$v_{pn}$"=$v_{pz}\sqrt{1+2\delta}$ represents the qP-wave normal moveout (NMO) velocity, relative to the normal to the symmetry plane; "$v_{px}$"=$v_{pz}\sqrt{1+2\epsilon}$ represents the qP wave velocity in the symmetry plane; "$v_{sz}$" represents the qSV velocity normal to the symmetry plane; and "$\epsilon$" and "$\delta$" are anisotropic parameters that are defined in Thomsen, L., *Weak Elastic Anisotropy*, Geophysics, 51, 1954-1996 (1986).

In view of Eqs. 21-23, Eq. 24 may be rewritten as follows:

$$\omega^4 = ((v_{px}^2 + v_{sz}^2)f_2 + (v_{pz}^2 + v_{sz}^2)f_1)\omega^2 - \\ v_{px}^2 v_{sz}^2 f_2 \cdot f_2 - v_{pz}^2 v_{sz}^2 f_1 \cdot f_1 + (v_{pz}^2(v_{pn}^2 - v_{px}^2) - \\ v_{sz}^2(v_{pn}^2 + v_{pz}^2))f_1 \cdot f_2, \quad \text{Eq. 25}$$

where "$f_1$" and "$f_2$" are described as follows:

$$f_1 = k_x^2 \sin^2\theta \cos^2\phi + k_y^2 \sin^2\theta \sin^2\phi + k_z^2 \cos^2\theta, \text{ and}$$

$$+ k_x k_y \sin^2\theta \sin 2\phi + k_y k_z \sin 2\theta \sin\phi + k_x k_z \sin 2\theta \cos\theta \quad \text{Eq. 26}$$

$$f_2 = k_x^2 + k_y^2 + k_z^2 - f_1. \quad \text{Eq. 27}$$

By applying an inverse Fourier transformation to Eqs. 26 and 27, the following differential operators may be obtained:

$$H_1 = \sin^2\theta\cos^2\phi \frac{\partial^2}{\partial x^2} + \sin^2\theta\sin^2\phi \frac{\partial^2}{\partial y^2} + \cos^2\theta \frac{\partial^2}{\partial z^2} + \quad \text{Eq. 28}$$
$$\sin^2\theta\sin 2\phi \frac{\partial^2}{\partial x \partial y} + \sin 2\theta\sin\phi \frac{\partial^2}{\partial y \partial z} + \sin 2\theta\cos\phi \frac{\partial^2}{\partial x \partial z}, \text{ and}$$

$$H_2 = \frac{\partial^2}{\partial x^2} + \frac{\partial^2}{\partial y^2} + \frac{\partial^2}{\partial z^2} - H_1. \quad \text{Eq. 29}$$

It is noted, that for VTI, these differential operators do not contain mixed space derivatives. Direct solution of the corresponding fourth-order partial differential equation (PDE) in time, following immediately from Eq. 25, is cumbersome to solve as it is a fourth-order equation in time. Mixed spatial derivatives generally require more computation than derivatives in a single spatial variable because differencing operators become two or three dimensional convolutions rather than one dimensional. For this reason, equivalent coupled lower-order systems are sought.

Both sides of the dispersion relation of Eq. 25 may be multiplied with the wavefield $p(\omega, k_x, k_y, k_z)$ (the pressure wavefield) to derive the following equation:

$$\omega^2 p(\omega, k_x, k_y, k_z) = v_{px}^2 f_2 p(\omega, k_x, k_y, k_z) + \\ v_{sz}^2 f_1 p(\omega, k_x, k_y, k_z) + v_{sz}^2 f_1 p(\omega, k_x, k_y, k_z) + \\ (v_{pz}^2 - v_{sz}^2) f_1 q(\omega, k_x, k_y, k_z), \quad \text{Eq. 30}$$

In Eq. 30, the auxiliary function of $q(\omega, k_x, k_y, k_z)$ is defined as follows:

$$q(\omega, k_x, k_y, k_z) = \frac{(v_{pn}^2 - v_{sz}^2)f_2}{\omega^2 - v_{sz}^2 f_2 - v_{pz}^2 f_1} p(\omega, k_x, k_y, k_z), \quad \text{Eq. 31}$$

By applying an inverse Fourier transformation to both sides of Eqs. 30 and 31, the final equations may be written as follows:

$$\frac{\partial^2 p}{\partial t^2} = v_{px}^2 H_2 p + v_{pz}^2 H_1 q + v_{sz}^2 H_1 (p - q), \quad \text{Eq. 32}$$

and $$\frac{\partial^2 q}{\partial t^2} = v_{pn}^2 H_2 p + v_{pz}^2 H_1 q + v_{sz}^2 H_2 (p - q). \quad \text{Eq. 33}$$

Figure 17:
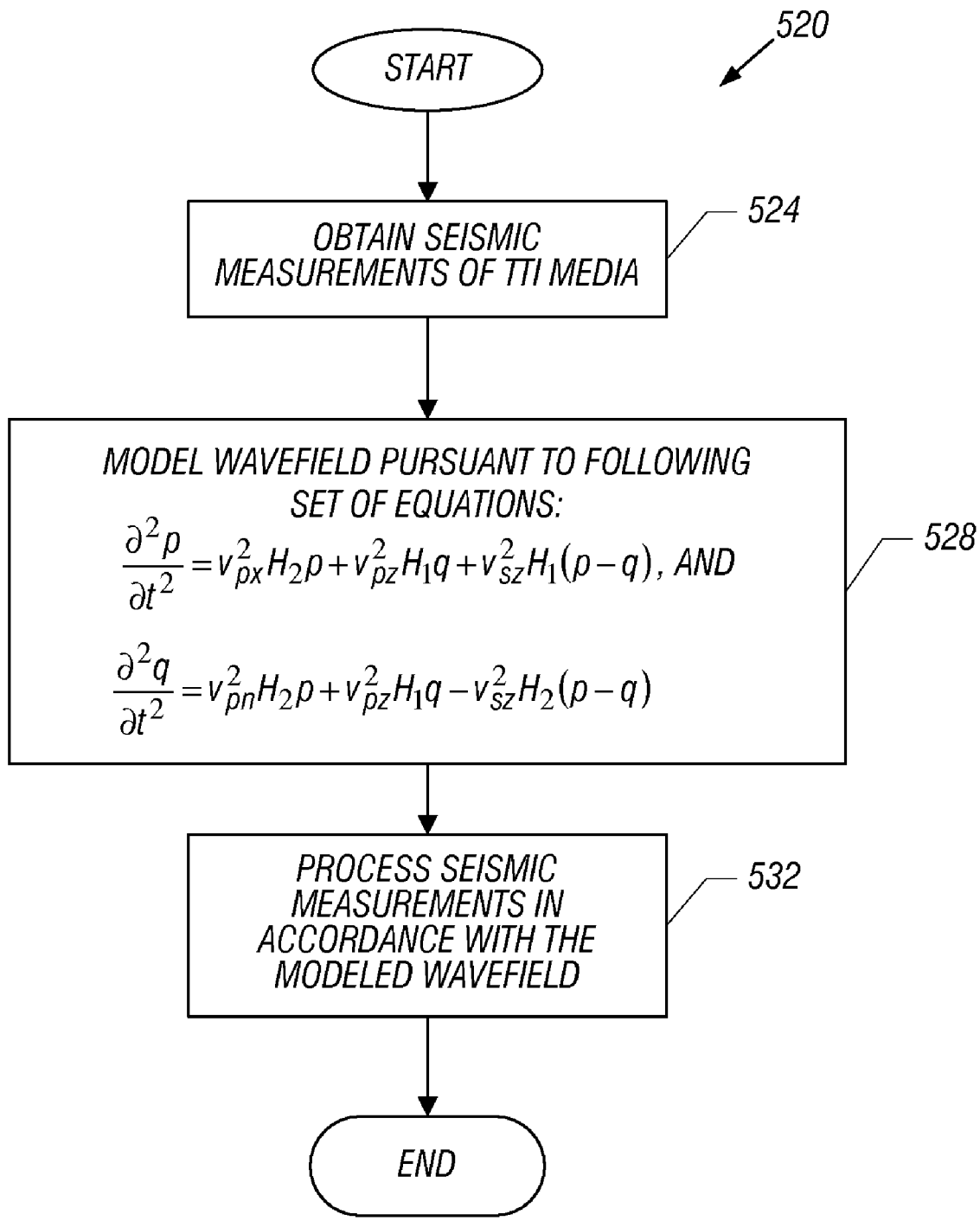

To summarize, a technique 520 that is depicted in FIG. 17 may be used in accordance with embodiments of the invention for purposes of processing seismic measurements obtained from TTI media. Referring to FIG. 17, pursuant to the technique 520, seismic measurements of TTI media are obtained, pursuant to block 524. A wavefield is then modelled, pursuant to Eqs. 32 and 33, pursuant to block 528. The seismic measurements are processed (block 532) in accordance with the modelled wavefield.

For seismic forward modeling, the source function is injected in the right side of both Eqs. 32 and 33. Evaluation of the constraint on the stiffness coefficients of TI media gives the following stability condition:

$$\epsilon - f^2 - f\delta + f - (1-f)\sqrt{f(f+2\delta)} \geq 0, \quad \text{Eq. 34}$$

where $$f = 1 - \frac{v_{sz}^2}{v_{pz}^2}. \quad \text{Eq. 35}$$

A "pseudo-acoustic" wave equation may be derived, based on Eqs. 32 and 33 by setting the vertical shear velocity $v_{sz}$ along the symmetry axis to zero. From the stability criteria that is set forth in Eqs. 34 and 35, when the vertical shear velocity $v_{sz}$ is set to equal zero, the condition reduces to $\epsilon - \delta \geq 0$.

It has been discovered that when the vertical shear velocity $v_{sz}$ is set equal to zero, and certain numerical computation techniques (such as an ordinary centered finite differences technique, for example) are used, an instability is introduced for some media that have inhomogeneous azimuth and dip angles. The instabilities usually start at locations in the azimuth and dip models where sharp contrasts exist.

The instabilities are due to the interaction of the SV artifact with rapid variations in the tilt axis. The following analysis and discussion details an approach of using a reasonable finite shear velocity in Eqs. 32 and 33 to remove triplications from the SV wavefront and stabilize wave propagation. The exemplary implementation set forth below is based on Eqs. 32 and 33 and uses ordinary centered finite differences.

Figure 18:
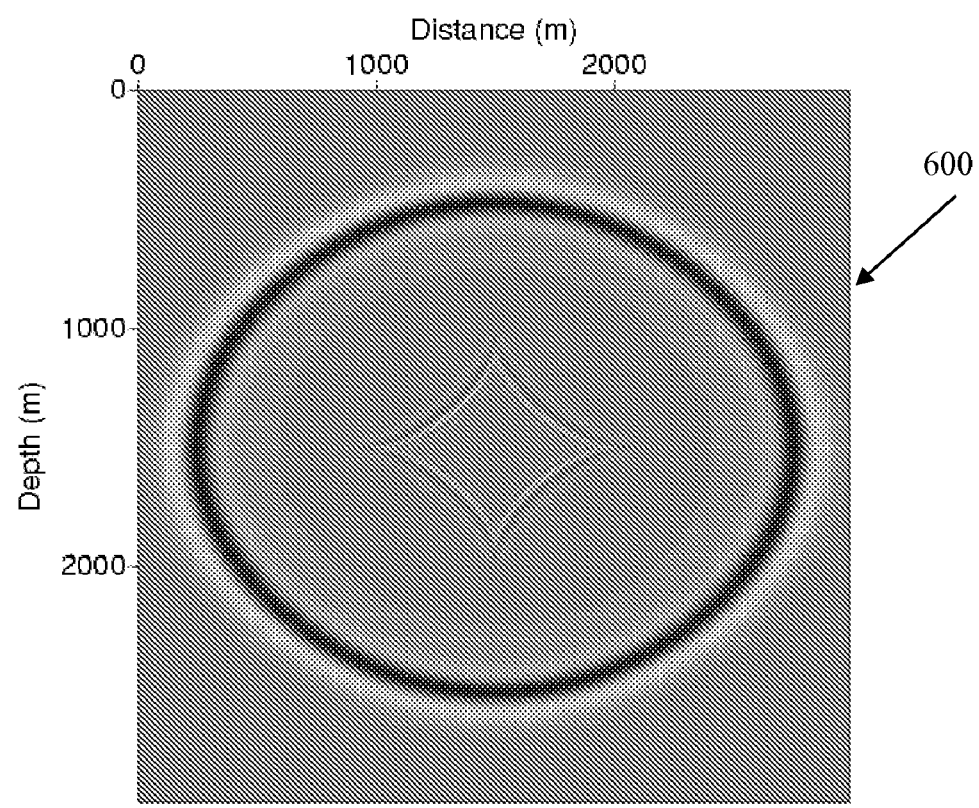
FIG. 18 illustrates a synthetic wavefield with a vertical axis of symmetry.
Figure 19:
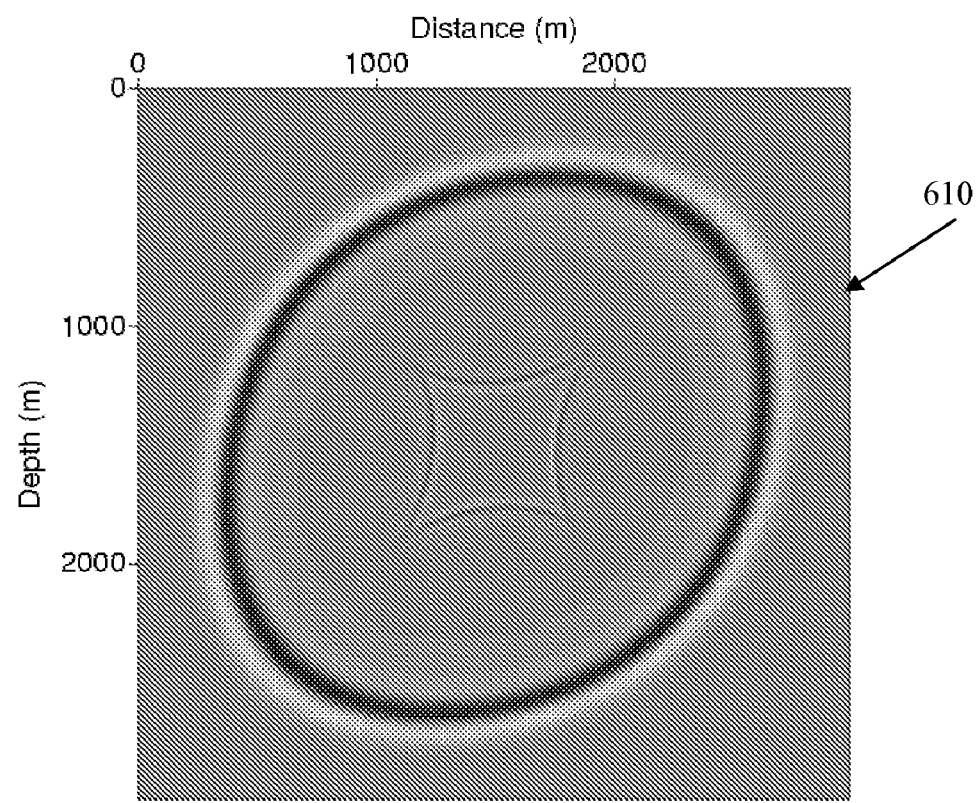
FIG. 19 illustrates a synthetic wavefield having a tilted axis of symmetry according to an embodiment of the invention.

In a modeling experiment, time snapshots of wave propagation in a homogenous anisotropic media ($v_{pz}$=3000 m/s, $v_{sz}$=0, $\epsilon$=0.24, and $\delta$=0.1) were simulated using finite differencing. FIGS. 18 and 19 correspond to the same time snapshot from 2-D modeling with each wave equation: FIG. 18 depicts a snapshot 600 that corresponds to a vertical axis of symmetry; and FIG. 19 depicts a snapshot 610 that corresponds to an axis of symmetry tilting at 45°. The ellipsoidal compressional P-wave wavefront and a diamond shape of the SV-wave aliasing wavefront are depicted in these figures.

Figure 20:
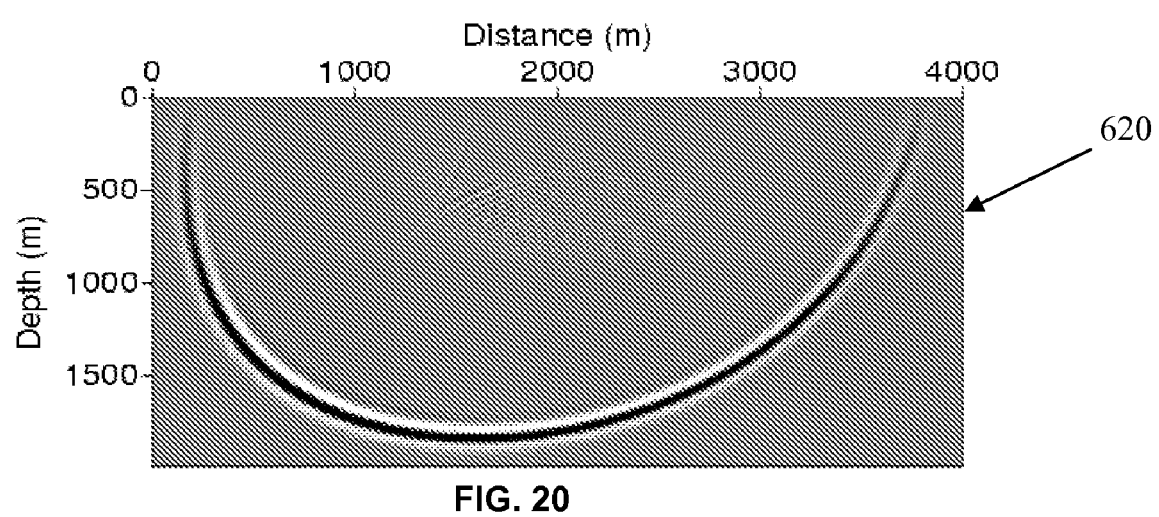
FIG. 20 illustrates an impulse response according to an embodiment of the invention.

Reverse-time migration (RTM) was implemented with Eqs. 32 and 33. A snapshot 620 in FIG. 20 depicts its impulse response in the same homogeneous anisotropic medium with a 45° tilting symmetry axis. In these experiments with a constant tilt axis, the wave propagation is stable.

In a significantly more complex 2-D anisotropic model, it has been discovered that the constructed wave propagation is unstable where a high contrast exists in the dip field. As described below, the constructed wave propagation was stabilized by adding a finite shear velocity.

The following parameter a largely determines the kinematic signatures of SV-waves in TI media:

$$\sigma = \frac{v_{pz}^2}{v_{sz}^2}(\varepsilon - \delta). \qquad \text{Eq. 36}$$

As described in Tsvankin, I., *Seismic Signatures and Analysis of Reflection Data in Anisotropic Media*, Elsevier, 2001, triplications in the SV wavefront are removed for values of $\sigma$ less than 0.8. It has been discovered that stability in the numerically-derived wavefield may be achieved by choosing the vertical shear velocity $v_{sz}$ large enough to ensure $\sigma$ is small enough to remove SV wavefront triplications, even with a highly heterogeneous tilt axis fields.

As described in the Tsvankin article, the reflection coefficient of SV-waves at a small-contrast interface between two weakly anisotropic TI media may be expressed as the sum of the corresponding coefficient in isotropic media $R_{isot}(\theta)$ and the anisotropic term:

$$R_{aniso,SV}(\theta) \approx \frac{1}{2}(\sigma_1 - \sigma_s)\sin^2\theta, \qquad \text{Eq. 37}$$

where "$\sigma_1$" and "$\sigma_2$" are the parameters defined in Eq. 36 for above and below the reflector. If the vertical shear velocity $v_{sz}$ is chosen to ensure a constant value of $\sigma$ for the TTI wave propagator, then this anisotropic term for the SV reflection coefficient is zero.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   modeling a seismic wavefield in a vertical transversely isotropic media as a second order derivative of a first wavefield function with respect to a vertical direction and not with respect to crossline and inline direction and as second order derivatives of a second wavefield function with respect to the inline and crossline directions and not with respect to the vertical direction; and
   processing seismic measurements of the media in a processor-based machine in accordance with the modeled seismic wavefield to obtain information about the media.

2. The method of claim 1, wherein the processing comprises performing migration to image a reflectivity distribution associated with the media.

3. The method of claim 1, wherein the modeling comprises:
   equating a second order derivative of the first wavefield function with respect to time to a summation of a.) a product of the square of a normal moveout velocity and the second order derivatives of the second wavefield function and b.) a product of the square of a vertical velocity and the second order derivative of the first wavefield function.

4. The method of claim 1, wherein the modeling comprises:
   equating a second order derivative of the second wavefield function with respect to time to a summation of a.) a product of the square of a horizontal velocity and the second order derivatives of the second wavefield function and b.) a product of the square of a vertical velocity and the second order derivative of the first wavefield function.

5. The method of claim 1, wherein the processing comprises performing a reverse time migration.

6. An article comprising a computer accessible storage medium to store
   instructions that when executed by a processor-based system cause the system to:
   model a seismic wavefield in a vertical transversely isotropic media as a second order derivative of a first wavefield function with respect to a vertical direction and not with respect to crossline and inline direction and as second order derivatives of a second wavefield function with respect to the inline and crossline directions and not with respect to the vertical direction; and
   process seismic measurements of the media in accordance with the modeled seismic wavefield to obtain information about the media.

7. The article of claim 6, the storage medium storing instructions that when executed cause the processor to perform migration to image a reflectivity distribution associated with the media.

8. The article of claim 6, the storage medium storing instructions that when executed cause the processor to:
   equate a second order derivative of the first wavefield function with respect to time to a summation of a.) a product of the square of a normal moveout velocity and the second order derivatives of the second wavefield function and b.) a product of the square of a vertical velocity and the second order derivative of the first wavefield function.

9. The article of claim 6, the storage medium storing instructions that when executed cause the processor to:
   equating a second order derivative of the second wavefield function with respect to time to a summation of a.) a product of the square of a horizontal velocity and the second order derivatives of the second wavefield function and b.) a product of the square of a vertical velocity and the second order derivative of the first wavefield function.

10. The article of claim 6, the storage medium storing instructions that when executed cause the processor to perform a reverse time migration.

11. A system comprising:
an interface to receive seismic measurements of a vertical transversely isotropic media; and
a processor to:
model a seismic wavefield in the media as a second order derivative of a first wavefield function with respect to a vertical direction and not with respect to crossline and inline direction and as second order derivatives of a second wavefield function with respect to the inline and crossline directions and not with respect to the vertical direction; and
process the seismic measurements in accordance with the modeled seismic wavefield to obtain information about the media.

12. The system of claim 11, wherein the processor perfolins migration to image a reflectivity distribution associated with the media.

13. The system of claim 11, wherein the processor equates a second order derivative of the first wavefield function with respect to time to a summation of a.) a product of the square of a nollnal moveout velocity and the second order derivatives of the second wavefield function and b.) a product of the square of a vertical velocity and the second order derivative of the first wavefield function.

14. The system of claim 11, wherein the processor equates a second order derivative of the second wavefield function with respect to time to a summation of a.) a product of the square of a horizontal velocity and the second order derivatives of the second wavefield function and b.) a product of the square of a vertical velocity and the second order derivative of the first wavefield function.

15. The system of claim 11, wherein the processor performs a reverse time migration.

16. The system of claim 11, further comprising:
a survey vessel.

17. The system of claim 16, further comprising:
a streamer adapted to be towed by the survey vessel, wherein the processor is part of the streamer.

18. A method comprising:
providing seismic measurements of a transversely isotropic media having a symmetry axis that is tilted relative to a vertical axis;
modeling a seismic wavefield in the media based at least in part on orientation of the symmetry axis and a nonzero shear velocity for the media; and
processing the seismic measurements of the media in a processor-based machine in accordance with the modeled seismic wavefield to obtain information associated with the media.

19. The method of claim 18, wherein the processing comprises performing migration.

20. The method of claim 18, wherein the processing comprises performing forward modeling.

21. The method of claim 18, further comprising:
controlling the modeling to regulate a stability of propagation described by the modeling.

22. The method of claim 21, wherein the act of controlling comprises removing vertical shear wave mode wavefront triplications.

23. The method of claim 21, wherein the act of controlling comprises regulating a shear velocity.

24. A system comprising:
an interface to receive seismic measurements of a transversely isotropic media having a symmetry axis that is tilted relative to a vertical axis; and
a processor to:
model a seismic wavefield in the media based at least in part on an orientation of the symmetry axis and a nonzero shear velocity for the media; and
process the seismic measurements of the media in accordance with the modeled seismic wavefield to obtain information associated with the media.

25. The system of claim 24, wherein the processing comprises performing migration.

26. The system of claim 24, wherein the processing comprises performing forward modeling.

27. The system of claim 24, further comprising:
controlling the modeling to regulate a stability of propagation described by the modeling.

28. The system of claim 27, wherein the act of controlling comprises removing vertical shear wave mode wavefront triplications.

29. The system of claim 27, wherein the act of controlling comprises regulating a shear velocity.

* * * * *